(12) United States Patent
Hirano et al.

(10) Patent No.: US 12,172,824 B2
(45) Date of Patent: Dec. 24, 2024

(54) VACUUM INSULATION MATERIAL, AND THERMALLY INSULATING CONTAINER AND THERMALLY INSULATING WALL USING SAME

(71) Applicant: Panasonic Intellectual Property Management Co., Ltd., Osaka (JP)

(72) Inventors: Toshiaki Hirano, Hyogo (JP); Hideji Kawarazaki, Osaka (JP); Tomoaki Kitano, Nara (JP); Noriyuki Miyaji, Shiga (JP); Yuichi Hata, Shiga (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 288 days.

(21) Appl. No.: 17/995,805

(22) PCT Filed: May 26, 2021

(86) PCT No.: PCT/JP2021/019930
§ 371 (c)(1),
(2) Date: Oct. 7, 2022

(87) PCT Pub. No.: WO2021/241617
PCT Pub. Date: Dec. 2, 2021

(65) Prior Publication Data
US 2023/0150750 A1    May 18, 2023

(30) Foreign Application Priority Data

May 27, 2020   (JP) ................................ 2020-092029

(51) Int. Cl.
*B65D 81/38*  (2006.01)
*F16L 59/065* (2006.01)

(52) U.S. Cl.
CPC ........ *B65D 81/3818* (2013.01); *F16L 59/065* (2013.01); *F25D 2201/14* (2013.01)

(58) Field of Classification Search
None
See application file for complete search history.

(56) References Cited

U.S. PATENT DOCUMENTS 10,337,786 B2 *   7/2019   Hayashino ......... B65D 81/3813
12,085,463 B2 *   9/2024   Hirano ............... B65D 81/2015
(Continued)

FOREIGN PATENT DOCUMENTS

| JP | 09-119771 | 5/1997 |
|---|---|---|
| JP | 2012-102758 | 5/2012 |
| WO | 2016/208193 | 12/2016 |

OTHER PUBLICATIONS

International Search Report issued in International Application No. PCT/JP2021/019930, Aug. 3, 2021, 4 pages w/ translation.

*Primary Examiner* — Don M Anderson
(74) *Attorney, Agent, or Firm* — HSML P.C.

(57) ABSTRACT

Refrigerator door (25) includes outer packaging material (55) including a resin sheet, and a core material and gas adsorption each contained in outer packaging material (55). The gas adsorption device includes a vacuum sealed container containing a gas adsorbing substance that adsorbs various gases, an opening pin that opens the vacuum sealed container by a physical load from an outside, and a load-bearing spacer that suppresses displacement of the opening pin to less than or equal to a predetermined amount.

8 Claims, 8 Drawing Sheets

(56) References Cited

U.S. PATENT DOCUMENTS

| | | | |
|---|---|---|---|
| 2015/0260331 A1* | 9/2015 | Shinohara | B60R 13/0815 |
| | | | 428/319.1 |
| 2017/0096284 A1* | 4/2017 | Hirano | F25D 23/065 |
| 2019/0145697 A1* | 5/2019 | Naik | F25D 23/062 |
| | | | 312/400 |
| 2022/0105702 A1* | 4/2022 | Hirano | B32B 27/06 |
| 2023/0150750 A1* | 5/2023 | Hirano | B65D 81/3818 |
| | | | 220/592.27 |
| 2023/0406600 A1* | 12/2023 | Kagimoto | B65D 81/266 |
| 2024/0116693 A1* | 4/2024 | Ishita | B65D 81/3818 |

* cited by examiner

VACUUM INSULATION MATERIAL, AND THERMALLY INSULATING CONTAINER AND THERMALLY INSULATING WALL USING SAME

TECHNICAL FIELD

The present disclosure relates to a vacuum heat insulator, and a heat insulating container and a heat insulating wall using the vacuum heat insulator.

BACKGROUND ART

PTL 1 discloses a heat insulating box in which an inside of the heat insulating box is exhausted and evacuated to be a vacuum heat insulating material. PTL 2 discloses a vacuum heat insulating material in which a moisture adsorbent or a gas adsorbent that adsorbs invading moisture or air is further installed in advance in an outer packaging material made of a resin material having low gas permeability in order to secure heat insulation performance over a long period of time.

CITATION LIST

Patent Literature

PTL 1: Unexamined Japanese Patent Publication No. H09-119771
PTL 2: Unexamined Japanese Patent Publication No. 2012-102758

SUMMARY OF THE INVENTION

The present disclosure provides a vacuum heat insulator capable of maintaining high heat insulation performance for a long period of time by avoiding deactivation of a gas adsorbent and maximizing adsorption capability of the gas adsorbent, and a heat insulating container and a heat insulating wall using the vacuum heat insulator.

A vacuum heat insulator according to the present disclosure includes an outer packaging material including a resin sheet, and a core material and a gas adsorption device each contained in the outer packaging material. The gas adsorption device includes a vacuum sealed container containing a gas adsorbing substance that adsorbs a gas, an opening pin that opens the vacuum sealed container by a physical load from an outside, and a load-bearing spacer that suppresses displacement of the opening pin to less than or equal to a predetermined amount

DESCRIPTION OF EMBODIMENT (Knowledge and the Like Underlying the Present Disclosure)

In recent years, from the viewpoint of prevention of global warming, improvement of energy saving is strongly desired, and improvement of energy saving is an urgent problem also in household electrical appliances. In particular, in heat-retaining and cold-keeping devices such as refrigerators, freezers, and vending machines, a heat insulating material having excellent heat insulation performance is required from the viewpoint of efficiently using heat.

As a general heat insulating material, a material selected from a fiber material such as glass wool and a foam such as urethane foam is used. In order to improve the heat insulation performance of these heat insulating materials, it is necessary to increase a thickness of each of the heat insulating materials. However, in a case where a space to be filled with the heat insulating material is limited, for example, in a case where space saving is required or in a case where effective use of the space is required, it is difficult to apply the general heat insulating material described above.

Therefore, a vacuum heat insulating material has been proposed as a high-performance heat insulating material. The vacuum heat insulating material is a heat insulator in which a core material having a role of a spacer is inserted into an outer packaging material having a gas barrier property, and the inside is sealed by being depressurized.

This vacuum heat insulating material has heat insulation performance about 20 times that of urethane foam, and has excellent characteristics that sufficient heat insulation performance can be obtained even when the thickness is reduced.

Accordingly, the vacuum heat insulating material attracts attention as an effective means for improving energy saving property by improving heat insulation performance while satisfying customer's demand for increasing an internal volume of a heat insulating box.

For example, in a refrigerator, in a heat insulating box constituting a refrigerator body, a heat insulating space between an inner box and an outer box is filled with urethane foam by foaming. Then, a vacuum heat insulating material is additionally installed in the heat insulating space to enhance the heat insulating property. This increases the internal volume of the heat insulating box.

Generally, a heat insulating space of a heat insulating box such as a refrigerator has a complicated shape. On the other hand, since it is generally difficult to perform processing that follows a complicated shape, particularly processing in a thickness direction, the vacuum heat insulating material is provided in a flat plate shape. For this reason, there is a limit to improvement of an area that can be covered by the vacuum heat insulating material, in other words, a ratio of the area of the vacuum heat insulating material to a total heat transfer area of the heat insulating box.

Therefore, for example, a technique has been proposed in which a heat insulating space of a heat insulating box is filled with open-cell urethane from an air feeding inlet port for blow molding of the heat insulating box and the open-cell urethane is foamed, and then the inside of the heat insulating box is exhausted and evacuated by a vacuum evacuation device connected to the air feeding inlet port, thereby forming the heat insulating box itself as a vacuum heat insulating material (See, for example, PTL 1).

Similarly to PTL 1, the present applicant has also proposed a technique in which a heat insulating space of a heat insulating box to be a refrigerator body is filled with open-cell urethane and the open-cell urethane is foamed, and then vacuuming is performed to make the heat insulating box itself a vacuum heat insulating material.

For the heat insulating space having a complicated shape, a vacuum heat insulator suitable for the complicated shape can be obtained as follows. That is, for each of the inner box and the outer box, an outer packaging material molded in accordance with a desired heat insulating space is produced by blow molding or vacuum molding a resin. Then, a core material obtained by foaming a resin such as open-cell urethane forming the heat insulating space itself is covered with an outer packaging material, and the inside is vacuum-sealed.

The heat insulator thus obtained in the heat insulating space having a complicated shape has higher overall heat insulation performance than a conventional heat insulator including a planar vacuum heat insulating material and urethane foam for filling gaps between the vacuum heat insulating material, and the inner box and the outer box. Therefore, it is possible to produce an effect of reducing the thickness of the heat insulating material to increase the internal volume or an effect of reducing the appearance, and an effect of reducing the weight.

As described above, the vacuum heat insulator formed by vacuum-sealing open-cell urethane as the core material and the resin molding material as the outer packaging material can vacuum-insulate the entire area of the heat insulating space even when the vacuum heat insulator has a complicated external appearance like a heat insulating box. Accordingly, by using such a vacuum heat insulator in, for example, a refrigerator, the thickness of the heat insulating box itself can be reduced, and the internal capacity (storage space) can be further increased.

Further, such a vacuum heat insulator is not complicated in shape, but can be applied to applications in which heat insulating properties are strongly expected, for example, an LNG storage tank for storing an ultra-low temperature substance such as liquefied natural gas (LNG), or a panel for a heat insulating container such as a tank of an LNG transport tanker. This makes it possible to effectively suppress intrusion of heat into the heat insulating container while reducing a wall thickness of the heat insulating container. Therefore, in the case of the LNG tank, the generation of a boil-off gas (BOG) can be effectively reduced, and a natural vaporization rate (boil-off rate, BOR) of LNG can be reduced.

In such a vacuum heat insulator, in order to secure heat insulation performance over a long period of time, a resin material having low gas permeability is used as an outer packaging material, and a moisture adsorbent or a gas adsorbent that adsorbs invading moisture or air is installed in the vacuum heat insulator in advance (See, for example, PTL 2).

When the gas adsorbent is exposed to an atmospheric pressure before evacuation, the gas adsorbent is immediately deactivated because of its very high adsorption rate, and after evacuation, the gas adsorbent is brought into a state of hardly adsorbing any more gas. For this reason, conventionally, the gas adsorbent is sealed in a vacuum sealed container in advance, and the container of the gas adsorbent is opened by some method from the outside after a state in which there is almost no residual gas around the gas adsorbent after evacuation. As a result, the gas adsorbent exhibits its original adsorption capability.

That is, the container of the gas adsorbent should not be already opened when the container is to be opened, or should not be unopened when the container is to be opened. In the former case, it is considered that the gas adsorbent is already deactivated when it is desired to open the container of the gas adsorbent, and in the latter case, the performance of the gas adsorbent cannot be exhibited at all. In either case, regardless of the initial performance, a degree of vacuum cannot be maintained for a long period of time, and there is a problem that the heat insulation performance of the vacuum heat insulating material cannot be maintained.

The inventors have found that there is a problem as described above, and have come to constitute the subject matter of the present disclosure in order to solve the problem.

The present disclosure provides a vacuum heat insulator capable of maximizing adsorption capability of a gas adsorbent and maintaining high heat insulation performance over a long period of time, and a heat insulating container and a heat insulating wall using the vacuum heat insulator.

Exemplary embodiments will be described in detail below with reference to the drawings. However, an unnecessarily detailed description will be omitted in some cases. For example, detailed description of already well-known matters or redundant description of substantially the same configuration may be omitted.

Note that the accompanying drawings and the following description are provided to help those skilled in the art to fully understand the present disclosure and are not intended to limit the subject matter recited in the claims.

First Exemplary Embodiment

Figure 1:
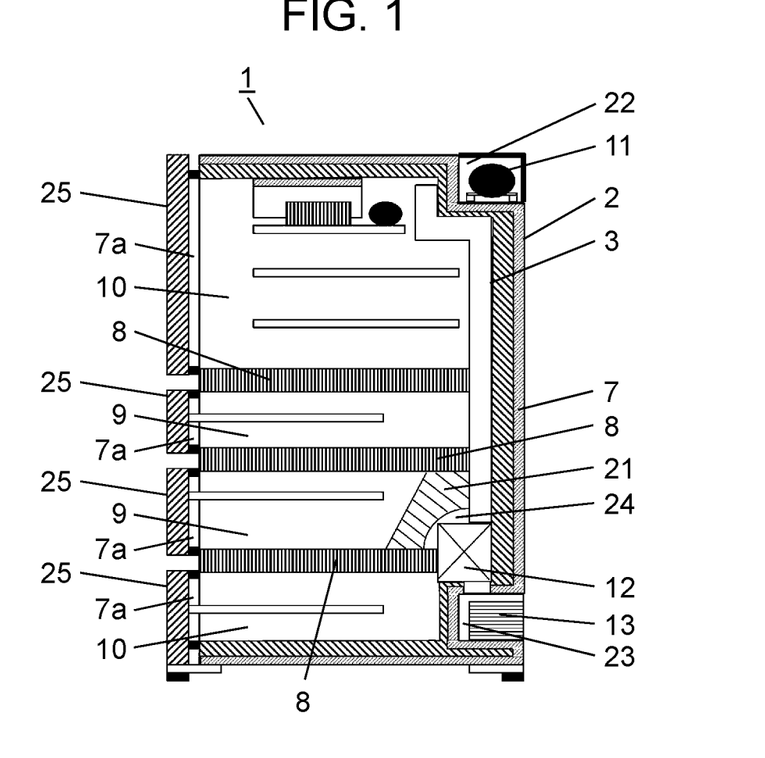
FIG. 1 is a sectional view of a refrigerator including a vacuum heat insulator according to a first exemplary embodiment.
Figure 2:
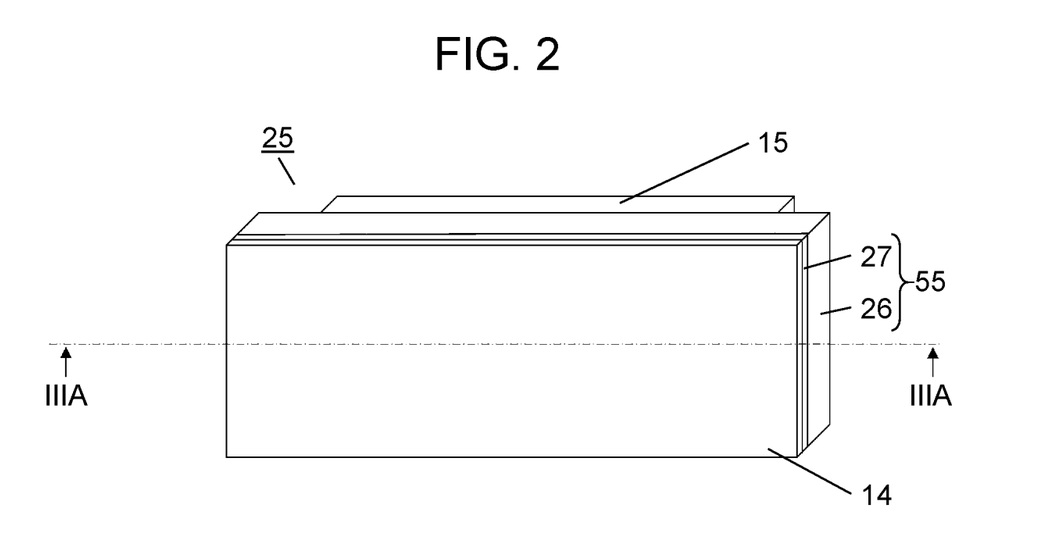
FIG. 2 is a perspective view of a refrigerator door to which the vacuum heat insulator according to the first exemplary embodiment is applied.
Figure 3A:
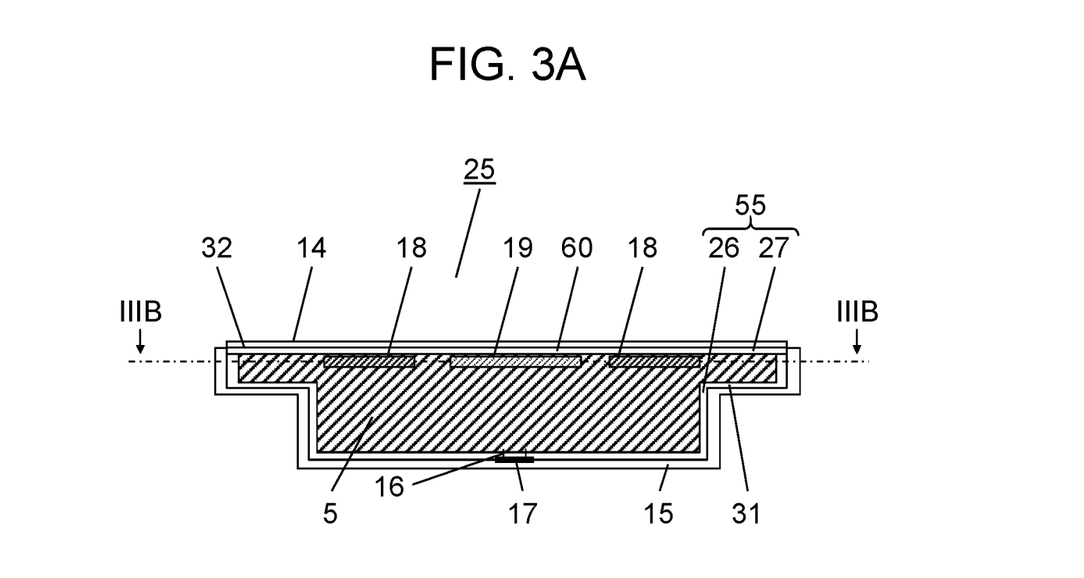
FIG. 3A is a sectional view taken along line IIIA-IIIA in FIG. 2.
Figure 3B:
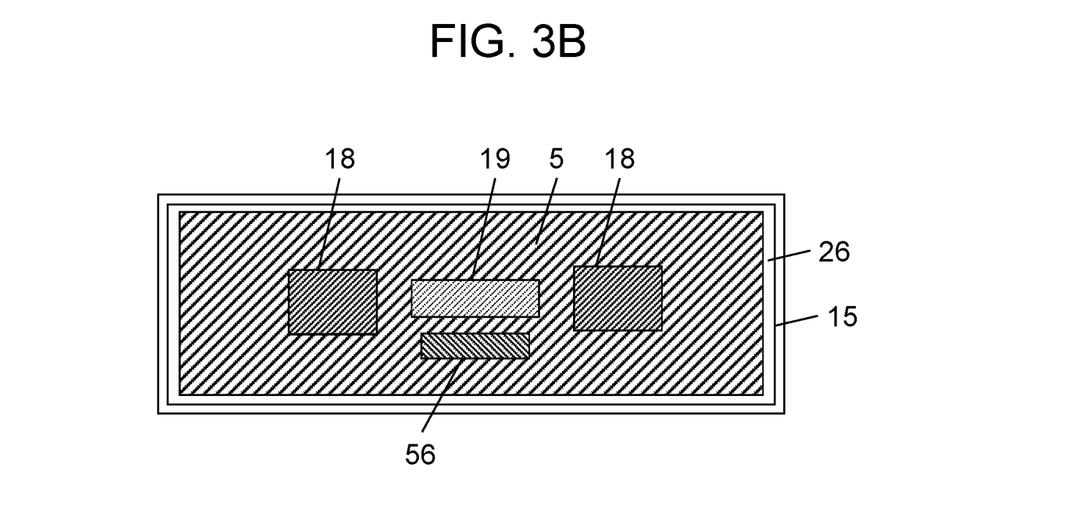
FIG. 3B is a sectional view taken along line IIIB-IIIB of FIG. 3A.
Figure 4A:
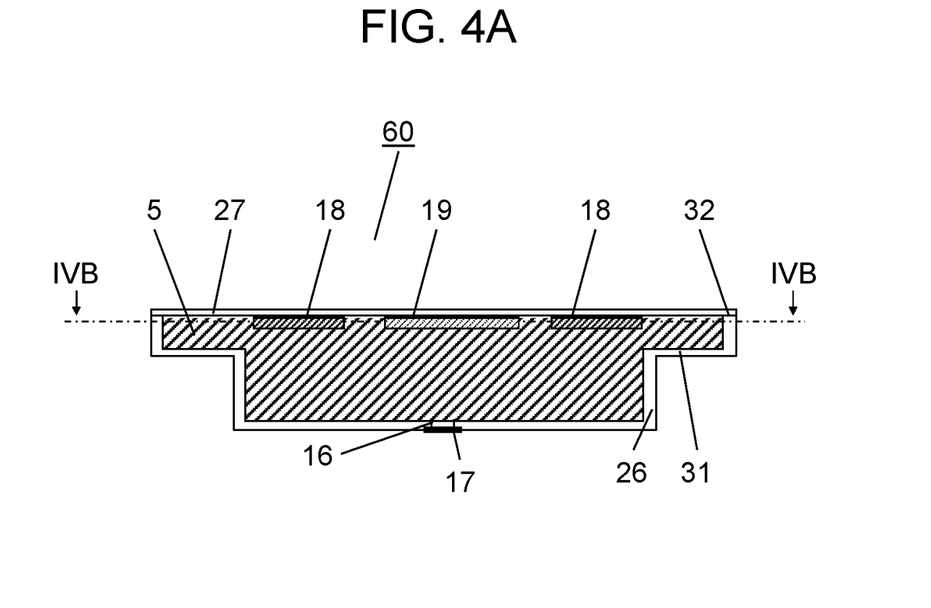
FIG. 4A is a sectional view of the vacuum heat insulator according to the first exemplary embodiment.
Figure 4B:
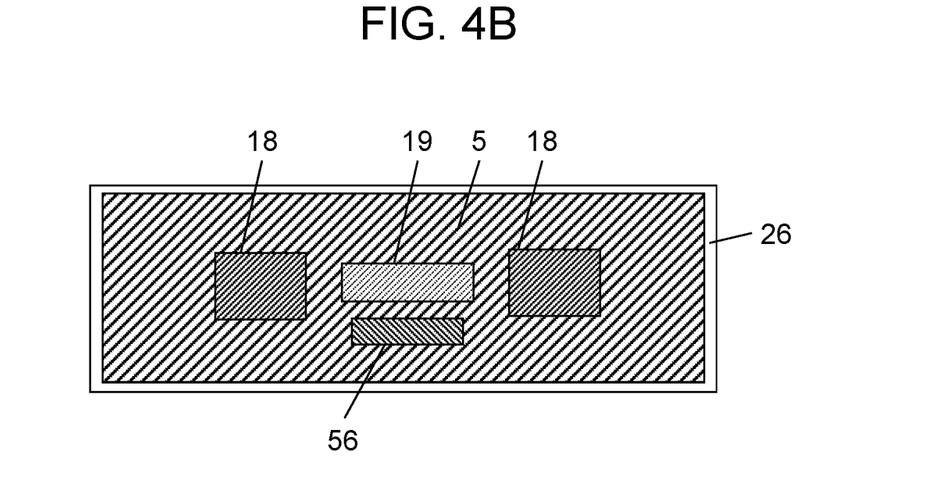
FIG. 4B is a sectional view taken along line IVB-IVB in FIG. 4A.
Figure 4C:
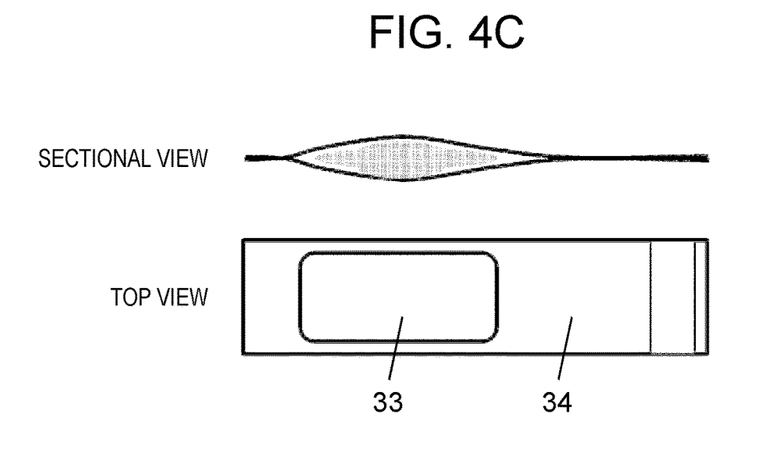
FIG. 4C is a sectional view and a top view of a vacuum sealed container included in a gas adsorption device contained in the vacuum heat insulator according to the first exemplary embodiment.
Figure 4D:
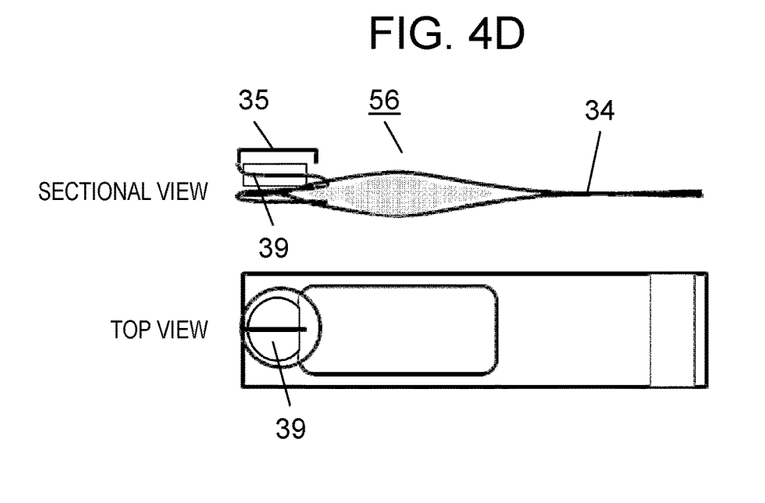
FIG. 4D is a sectional view and a top view of the gas adsorption device contained in the vacuum heat insulator according to the first exemplary embodiment.
Figure 4E:
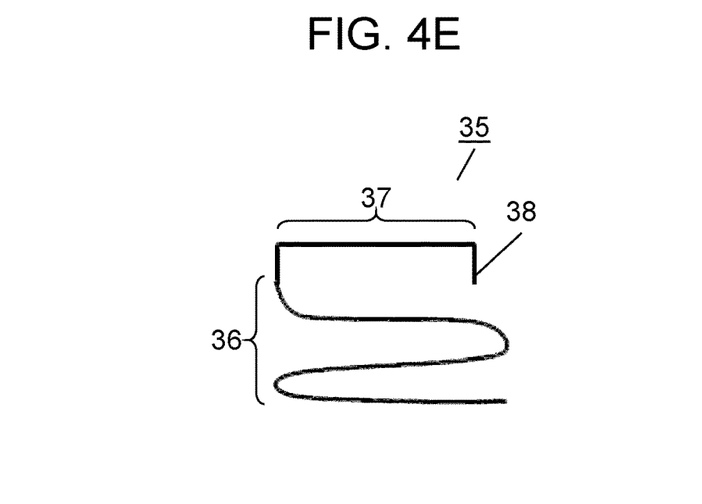
FIG. 4E is a diagram illustrating a configuration of an opening pin of the gas adsorption device contained in the vacuum heat insulator according to the first exemplary embodiment.
Figure 5:
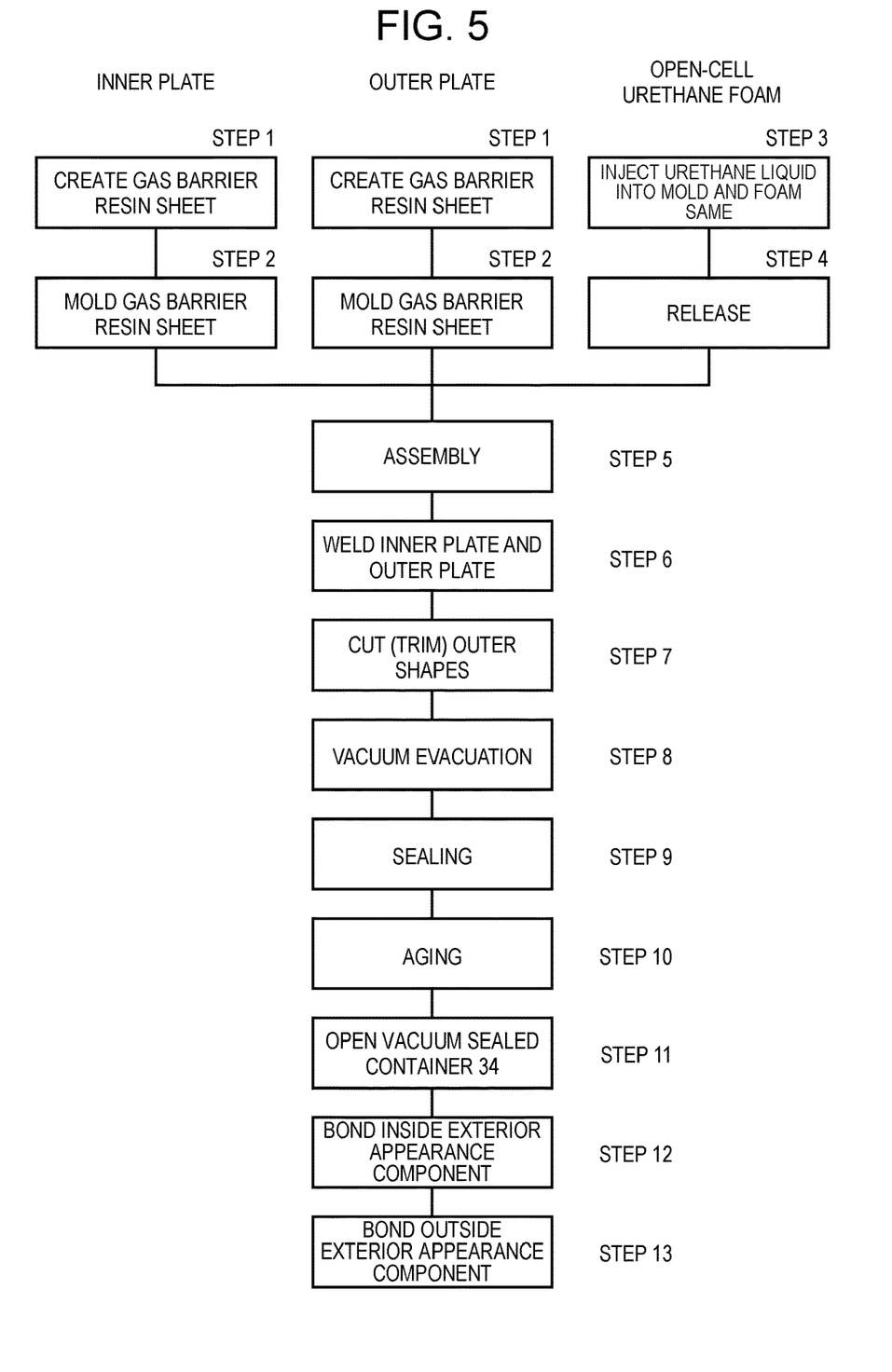
FIG. 5 is a flowchart illustrating a method of manufacturing the refrigerator door including the vacuum heat insulator according to the first exemplary embodiment.

A first exemplary embodiment will be described below with reference to FIGS. 1 to 5. FIG. 1 is a sectional view of refrigerator 1 including vacuum heat insulator 60 according to the first exemplary embodiment. FIG. 2 is a perspective view of refrigerator door 25 to which vacuum heat insulator 60 is applied. FIG. 3A is a sectional view taken along line IIIA-IIIA in FIG. 2. FIG. 3B is a sectional view taken along line IIIB-IIIB of FIG. 3A. FIG. 4A is a sectional view of vacuum heat insulator 60. FIG. 4B is a sectional view taken along line IVB-IVB in FIG. 4A. FIG. 4C illustrates a sectional view and a top view of vacuum sealed container 34 included in gas adsorption device 56 included in vacuum heat insulator 60. FIG. 4D illustrates a sectional view and a top view of gas adsorption device 56. FIG. 4E is a diagram illustrating a configuration of an opening pin of gas adsorption device 56. FIG. 5 is a flowchart illustrating a method of manufacturing refrigerator door 1 including vacuum heat insulator 60.

1-1. Configuration cl 1-1-1. Application Example to Refrigerator Door

Hereinafter, vacuum heat insulator 60 according to the present exemplary embodiment will be described with reference to an example applied to refrigerator door 25.

In FIG. 1, refrigerator 1 includes refrigerator door 25. A foamed heat insulating material (not illustrated) is filled between outer box 2 and inner box 3 of refrigerator 1 to form heat insulating box 7. Inside heat insulating box 7, freezing chamber 9 and refrigerating chamber 10 partitioned by partitioning body 8 are disposed.

Compressor 11 is disposed in machine chamber 22 in an upper part of heat insulating box 7, and evaporation pan 13 is disposed in lower machine chamber 23. Evaporator 12 is disposed in cooling chamber 24 formed on a back surface of freezing chamber 9.

Freezing chamber 9 and cooling chamber 24 are partitioned by cooling chamber wall body 21. Refrigerator door 25 is disposed in each of front opening parts 7a of heat insulating box 7 corresponding to freezing chamber 9 and refrigerating chamber 10.

As illustrated in FIGS. 3A and 3B, refrigerator door 25 includes outer plate 27, outside exterior appearance component 14, inner plate 26, and inside exterior appearance component 15. Gas barrier layer 31 against oxygen and the like is formed inside outer plate 27. Outside exterior appearance component 14 is disposed on a surface of outer plate 27 and is made of a glass plate, a metal plate, or the like. Gas barrier layer 31 against oxygen and the like is formed inside inner plate 26. Inside exterior appearance component 15 is disposed on a surface of inner plate 26, and is made of ABS resin or the like. Refrigerator door 25 includes open-cell urethane foam 5 (a core material of the vacuum heat insulator) filled in a heat insulating space between outer plate 27 and inner plate 26. Here, outer plate 27 and inner plate 26 correspond to outer packaging material 55.

Note that outer packaging material 55 wraps an outer surface of open-cell urethane foam 5 (the core material of the vacuum heat insulator).

Specifically, vacuum heat insulator 60 according to the present exemplary embodiment includes core material (open-cell urethane foam 5) that serves as a spacer, and outer packaging material 55 having a gas barrier property. Vacuum heat insulator 60 is configured such that the core material is inserted into outer packaging material 55, an inside of the vacuum heat insulator is depressurized through exhaust port 16 provided in a part of inner plate 26, and the vacuum heat insulator is sealed using sealing material 17. An outer periphery of each of outer plate 27 and inner plate 26 is bonded and sealed by thermal welding layer 32.

Further, as illustrated in FIGS. 3A and 3B, outside exterior appearance component 14 and inside exterior appearance component 15 are bonded to vacuum heat insulator 60 according to the present exemplary embodiment with an adhesive or the like to complete refrigerator door 25.

Note that FIGS. 4A and 4B illustrate a state before outside exterior appearance component 14 and inside exterior appearance component 15 of refrigerator door 25 are bonded to each other, that is, vacuum heat insulator 60 according to the present exemplary embodiment.

1-1-2. Manufacturing Method

Next, a method of manufacturing refrigerator door 25 including vacuum heat insulator 60 according to the first exemplary embodiment will be described.

In FIG. 5, outer plate 27 and inner plate 26 are made of a resin sheet having a high oxygen gas barrier property and a high water vapor gas barrier property. Outer plate 27 and inner plate 26 mainly need to be configured to suppress permeation of air and water vapor.

For example, a multilayer sheet in which an ethylene-vinyl alcohol copolymer resin (EVOH), which is a material having low oxygen permeability, is sandwiched between polypropylene, polyethylene, or the like, which is a material having low water vapor permeability, is prepared by an extrusion molding machine or the like in order to improve moldability (step 1). Then, the multilayer sheet prepared in step 1 is molded into a shape conforming to the shape of a part where heat insulation is required by vacuum molding, pressure molding, blow molding, or the like (step 2).

Note that a similar effect can be obtained by using polyvinyl alcohol (PVA) instead of EVOH. Inner plate 26 is provided with exhaust port 16 to which a welding mechanism (not illustrated) is connected, and inner plate 26 is sealed with sealing material 17 having at least a metal foil having a high oxygen gas barrier property.

When outer plate 27 is a complete plane, a resin laminate film containing a metal layer of aluminum, stainless steel, or the like is often used. This is because, by using a film, the thickness can be set to less than or equal to 0.1 mm, uniform heating is facilitated at the time of heat welding described later, and highly reliable vacuum heat insulator 60 can be obtained. However, when outer plate 27 is not a flat surface from the viewpoint of designability and the like, a resin sheet having a thickness of 0.2 mm or more is used similarly to inner plate 26.

Open-cell urethane foam 5 is molded by injecting a urethane liquid into a metal mold (not illustrated) having a shape of a heat insulating space between outer plate 27 and inner plate 26, and foaming and releasing the urethane liquid (step 3, step 4).

A method of manufacturing refrigerator door 25 will be described below with reference to FIG. 5.

Next, a gas adsorbent that adsorbs various gases and gas adsorption device 56 (described later) are installed in box-shaped inner plate 26 together with open-cell urethane foam 5.

Then, a molded article of open-cell urethane foam 5 is housed in inner plate 26 and covered with outer plate 27 (step 5). Heat and pressure are applied to an outer peripheral part where inner plate 26 and outer plate 27 are in contact with each other, and inner plate 26 and outer plate 27 are thermally welded (step 6).

At this time, as illustrated in FIG. 3A or FIG. 4A, when the adhesive layer (thermal welding layer 32) between outer plate 27 and inner plate 26 is a polypropylene layer, the polypropylene resins are thermally welded.

As the gas adsorbent, gas adsorbent 19 that selectively adsorbs air or moisture adsorbent 18 that adsorbs moisture is known. This gas adsorbent adsorbs a remaining gas that cannot be exhausted by evacuation or a trace amount of gas that has permeated through inner plate 26 or outer plate 27 having a high gas barrier property in a long period of time, so that a degree of vacuum can be maintained for a long period of time.

As illustrated in FIGS. 4C, 4D, and 4E, gas adsorption device 56 includes vacuum sealed container 34, opening pin 35, and load-bearing spacer 39. Vacuum sealed container 34 contains gas adsorbing substance 33 including zeolite or the like that adsorbs various gases. Opening pin 35 opens vacuum sealed container 34 by a physical load from the outside. Load-bearing spacer 39 suppresses displacement of opening pin 35 to less than or equal to a predetermined amount.

For example, as illustrated in FIG. 4E, opening pin 35 includes pin part 38 that opens vacuum sealed container 34, spring part 36 that biases pin part 38 outward, and pin support part 37. Pin support part 37 supports pin part 38 and has a function as a coupling part that couples pin part 38 and spring part 36.

Returning to FIG. 5, next, outer shapes of inner plate 26 and outer plate 27 that have been thermally welded are cut into predetermined shapes (step 7).

Vacuum heat insulator 60 including inner plate 26 and outer plate 27 that are thermally welded is evacuated for a predetermined time through exhaust port 16 by a vacuum evacuation device (not illustrated) (step 8). Then, exhaust port 16 is welded and sealed by ultrasonic welding or the like using sealing material 17 (step 9). Accordingly, vacuum heat insulator 60 can be obtained.

In order to shorten the exhaust time and improve the productivity, it is desirable that a vent hole (not illustrated) of open-cell urethane foam 5 (core material) is connected to exhaust port 16. Note that sealing material 17 includes an adhesive layer, a metal foil, and a heat-resistant protective layer (not illustrated) in order from the closest to exhaust port 16.

The adhesive layer is disposed inside the metal foil. A melting point of the adhesive layer is less than or equal to 180° C. The heat-resistant protective layer is disposed outside the metal foil. The heat-resistant protective layer is a heat-resistant layer having a melting point of higher than or equal to 200° C.

Note that in the present exemplary embodiment, exhaust port 16 is substantially circular, and a hole diameter of exhaust port 16 is more than or equal to 1 mm.

Vacuum heat insulator 60 is aged at about 20° C. to 40° C. for several hours to several days after sealing of exhaust port 16 (step 10). As a result, residual moisture in vacuum heat insulator 60 is adsorbed by moisture adsorbent 18. Thereafter, as illustrated in FIGS. 4C, 4D, and 4E, gas adsorption device 56 including vacuum sealed container 34 in which gas adsorbing substance 33 is enclosed and opening pin 35 is pushed by physically applying a load through outer plate 27, so that vacuum sealed container 34 is opened by opening pin 35 (step 11). As a result, gas adsorbing substance 33 is exposed to a sealed space of vacuum heat insulator 60, and it is possible to adsorb the residual gas excluding moisture and the gas entering from the outside through outer plate 27 or inner plate 26 over a subsequent long period. After step 11, inside exterior appearance component 15 and outside exterior appearance component 14 are bonded to obtained vacuum heat insulator 60, respectively (step 12, step 13), to complete refrigerator door 25.

1-2. Operation

In gas adsorption device 56 of vacuum heat insulator 60 configured as described above in the present exemplary embodiment, load-bearing spacer 39 is provided between pin support part 37 that supports pin part 38 of opening pin 35 and vacuum sealed container 34 that contains gas adsorbing substance 33. As a result, it is possible to prevent outer plate 27 from pushing opening pin 35 of gas adsorption device 56 and opening vacuum sealed container 34 due to a compressive stress applied to outer plate 27 by the atmospheric pressure after the step of evacuating vacuum heat insulator 60 shown in step 8.

Load-bearing spacer 39 is provided for the purpose of preventing pin part 38 from approaching a distance less than or equal to a distance to vacuum sealed container 34 in which gas adsorbing substance 33 is sealed. Thus, load-bearing spacer 39 does not need to be located between vacuum sealed container 34 and pin part 38, and may be located between vacuum sealed container 34 and pin support part 37. A material used for load-bearing spacer 39 may be the same material as open-cell urethane foam 5 selected for the purpose of withstanding a compressive stress caused by atmospheric pressure.

In the opening step of vacuum sealed container 34 shown in step 11, a load stronger than atmospheric compression, for example, a load of about 500 KPa is slowly applied to an immediate upper part of opening pin 35. As a result, load-bearing spacer 39 is also compressed, and vacuum sealed container 34 in which gas adsorbing substance 33 is sealed is eventually opened by pin part 38.

1-3. Effects and the Like

As described above, in the present exemplary embodiment, vacuum heat insulator 60 includes outer packaging material 55, open-cell urethane foam 5 (core material), and gas adsorption device 56. Outer packaging material 55 is made of a resin sheet (not illustrated). Open-cell urethane foam 5 is enclosed in outer packaging material 55.

Gas adsorption device 56 includes vacuum sealed container 34, opening pin 35, and load-bearing spacer 39. Vacuum sealed container 34 contains gas adsorbing substance 33 that adsorbs various gases. Opening pin 35 opens vacuum sealed container 34 by a physical load from the outside. Load-bearing spacer 39 suppresses displacement of opening pin 35 to less than or equal to a predetermined amount.

By providing load-bearing spacer 39 so that opening pin 35 does not approach vacuum sealed container 34 constituting gas adsorption device 56 by a distance or less due to a compressive stress by atmospheric pressure, it is possible to avoid opening of vacuum sealed container 34 during evacuation and before vacuum sealing. Therefore, it is possible to avoid that gas adsorbing substance 33 adsorbs a large amount of residual gas during evacuation and before vacuum sealing and the subsequent adsorption capability is impaired, so that the performance of vacuum heat insulator 60 can be maintained.

Further, after all the residual moisture is adsorbed by moisture adsorbent 18 after the vacuum sealing, vacuum sealed container 34 of gas adsorption device 56 is reliably opened by opening pin 35, so that the degree of vacuum and the heat insulation performance of refrigerator door 25 can be maintained for a long period of time. Accordingly, refrigerator door 25 having high reliability can be provided.

Note that opening pin 35 includes pin part 38 that opens vacuum sealed container 34, spring part 36, and pin support part 37 (coupling part) that couples pin part 38 and spring part 36. Since pin support part 37 of opening pin 35 is supported by load-bearing spacer 39, it is possible to prevent outer plate 27 from pushing opening pin 35 of gas adsorption device 56 and opening vacuum sealed container 34 by the compressive stress applied to outer plate 27 due to the atmospheric pressure after the step of evacuating vacuum heat insulator 60. Further, by pressing outer packaging material 55 from the surface of outer packaging material 55, a force pressed from the surface of outer packaging material 55 is received by pin support part 37 when vacuum sealed container 34 of gas adsorption device 56 is opened by opening pin 35. Therefore, pin part 38 can reliably open vacuum sealed container 34.

Load-bearing spacer 39 is provided for the purpose of preventing pin part 38 from approaching vacuum sealed container 34 of gas adsorption device 56 by a certain distance or less. Therefore, load-bearing spacer 39 does not need to be between vacuum sealed container 34 and pin part 38, and may be between vacuum sealed container 34 and pin support part 37. Thus, when it is desired to open vacuum sealed container 34, pin part 38 can be opened without being disturbed by load-bearing spacer 39. Accordingly, vacuum degree and heat insulation performance of refrigerator door 25 can be maintained for a long period of time, whereby vacuum heat insulator 60 having high reliability can be provided.

Note that load-bearing spacer 39 needs to withstand atmospheric compression. Therefore, it is desirable that load-bearing spacer 39 has a compressive strength of 200 kPa or more at 10% strain.

Note that load-bearing spacer 39 itself is also exposed to the vacuum space for a long period of time. Therefore, load-bearing spacer 39 is desirably made of a material that emits less gas. When open-cell urethane foam 5 used as the core material of vacuum heat insulator 60, for example, is used as the material of load-bearing spacer 39, evacuation is performed by vacuum evacuation similarly to the core material, and the residual gas is adsorbed by gas adsorbing substance 33.

Note that vacuum heat insulator 60 according to the present exemplary embodiment is used as a heat insulating wall (not illustrated) used for an inner wall or an outer wall of a refrigeration device (not illustrated) or a refrigerator (not illustrated). Accordingly, it is possible to provide a heat insulating wall which is inexpensive and can maintain heat insulation performance for a long period of time. In addition, energy saving of the device can be enhanced.

Second Exemplary Embodiment

Figure 6:
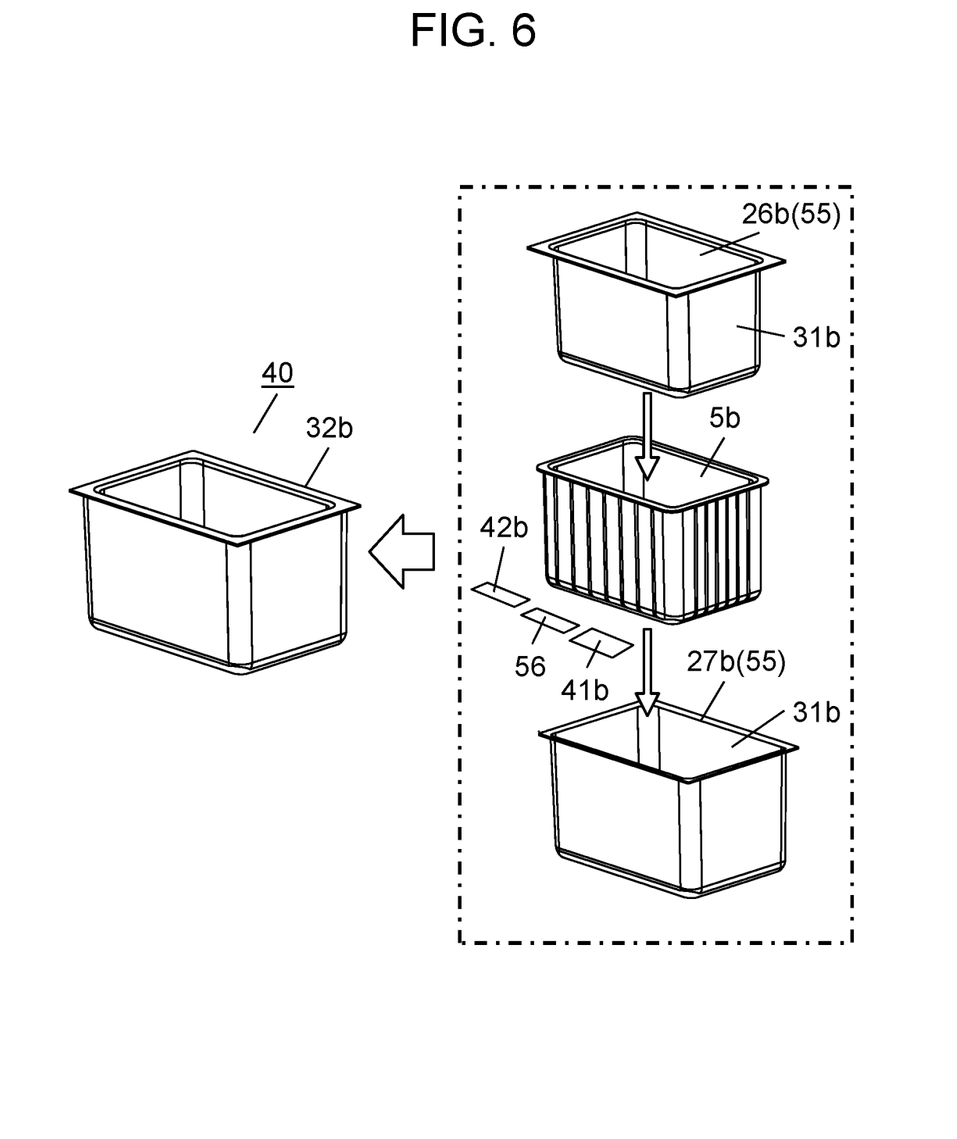
FIG. 6 is a perspective view and a component development perspective view of a heat insulating container according to a second exemplary embodiment.
Figure 7A:
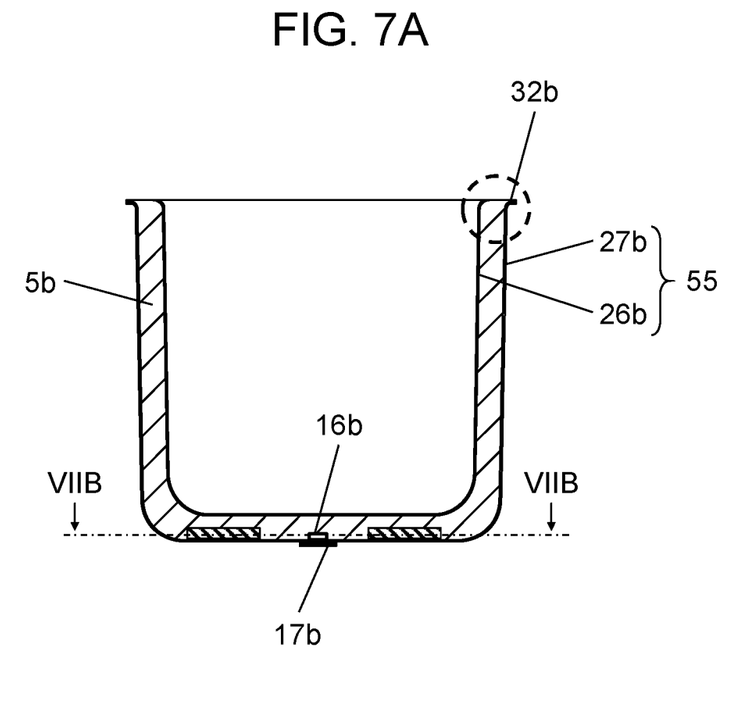
FIG. 7A is a sectional view of the heat insulating container according to the second exemplary embodiment.
Figure 7B:
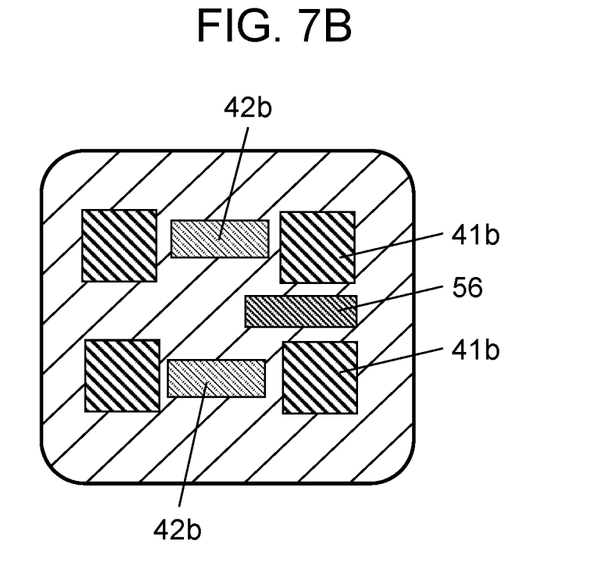
FIG. 7B is a sectional view taken along line VIIB-VIIB of FIG. 7A.
Figure 8:
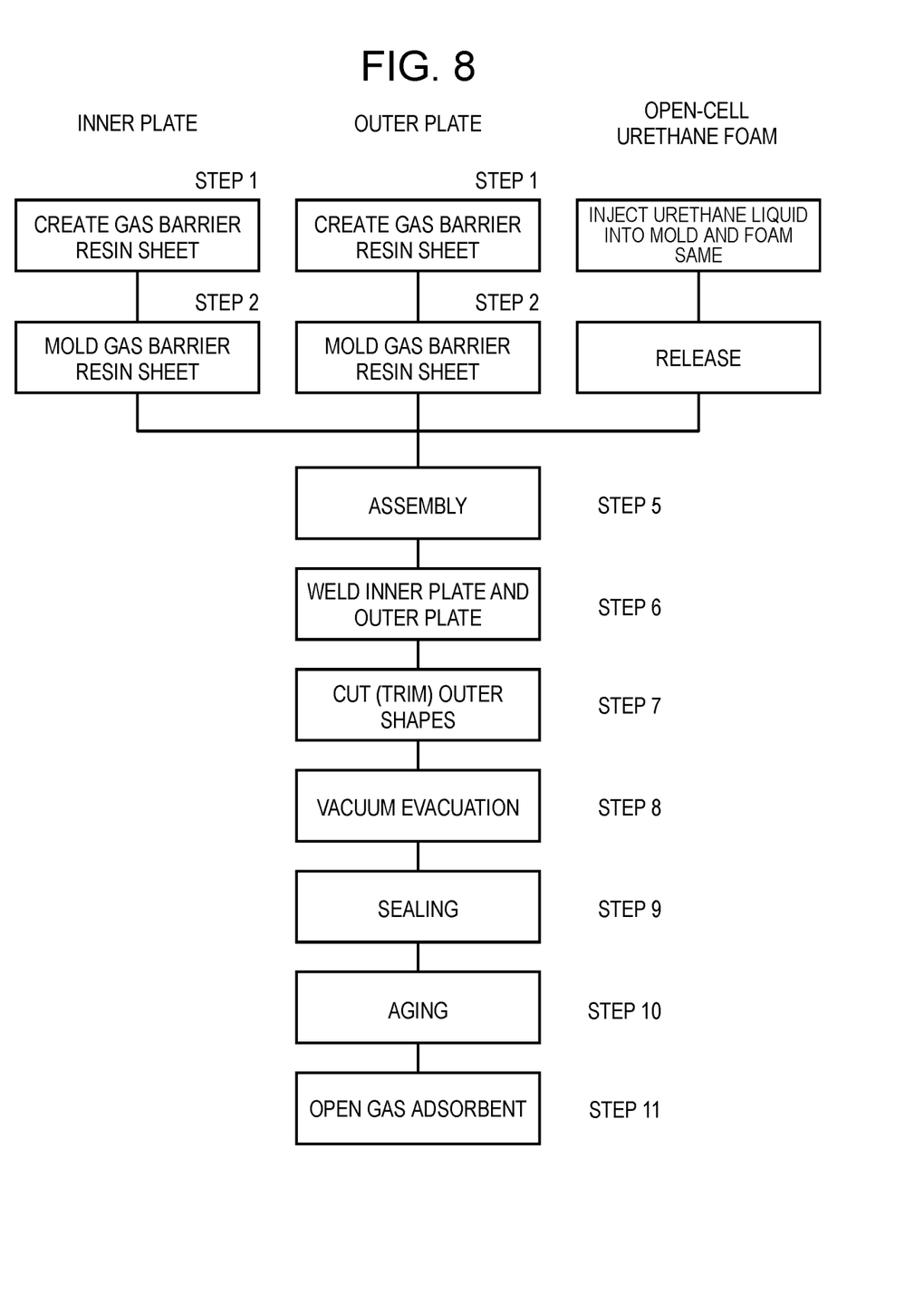
FIG. 8 is a flowchart illustrating a method of manufacturing the heat insulating container according to the second exemplary embodiment.

A second exemplary embodiment will be described below with reference to FIGS. 6 to 8. FIG. 6 illustrates a perspective view and a component development perspective view of heat insulating container 40 according to the second exemplary embodiment. FIG. 7A is a sectional view of heat insulating container 40. FIG. 7B is a sectional view taken along line VIIB-VIIB of FIG. 7A. FIG. 8 is a flowchart illustrating a method of manufacturing heat insulating container 40. cl 2-1. Configuration In FIGS. 6, 7A, and 7B, heat insulating container 40 according to the present exemplary embodiment includes outer box 27b, inner box 26b, and open-cell urethane foam 5b (core material) filling a heat insulating space between outer box 27b and inner box 26b. Gas barrier layer 31b against oxygen or the like is formed inside outer box 27b and inner box 26b. Here, outer box 27b and inner box 26b correspond to outer packaging material 55.

Similarly to the configuration described in the first exemplary embodiment, in heat insulating container 40 serving as the vacuum heat insulator also in the present exemplary embodiment, the inside of outer packaging material 55 is decompressed through exhaust port 16b, and exhaust port 16b is sealed using sealing material 17b. Outer box 27b and inner box 26b are bonded and sealed by thermal welding layer 32b on the outer peripheries of outer box 27b and inner box 26b.

When the heat insulating space between outer box 27b and inner box 26b is filled with open-cell urethane foam 5b, air adsorbent 42b that selectively adsorbs air, moisture adsorbent 41b that adsorbs moisture, and gas adsorption device 56 described in the first exemplary embodiment are placed in the heat insulating space. The basic configuration of the vacuum heat insulator of heat insulating container 40 according to the present exemplary embodiment is similar to the configuration of the vacuum heat insulator according to the first exemplary embodiment so as to achieve effects similar to the effects described in the first exemplary embodiment.

2-2. Manufacturing Method

FIG. 8 is a flowchart illustrating a method of manufacturing heat insulating container 40 in the present second exemplary embodiment. The basic manufacturing flow is the same as in steps 1 to 11 of the first exemplary embodiment.

In the case of heat insulating container 40, neither outer box 27b nor inner box 26b has a planar shape. For this reason, a resin sheet having a thickness of 0.2 mm or more is used for both outer box 27b and inner box 26b.

In FIGS. 7A and 7B, in the opening step of the gas adsorption device 56, it is necessary to push opening pin 35 (see FIG. 4D) through a sheet thicker than that in first exemplary embodiment. Therefore, a load larger than that in the first exemplary embodiment, for example, a load of 1 MPa or more is slowly applied. As a result, load-bearing spacer 39 is also compressed, and vacuum sealed container 34 (see FIG. 4D) of gas adsorption device 56 is eventually opened by pin part 38 (see FIG. 4E).

2-3. Operation, Effect, and the Like

In the present exemplary embodiment, inner plate 26 in the first exemplary embodiment corresponds to inner box 26b, and outer plate 27 corresponds to outer box 27b. By forming inner box 26b and outer box 27b into a box shape, it is possible to provide heat insulating container 40 that is inexpensive and can maintain high heat insulation performance over a long period of time.

Note that, in the vacuum heat insulators according to the first and second exemplary embodiments, gas adsorption device 56 is used for the purpose of maintaining the heat insulation performance of the vacuum heat insulating material with high reliability over a long period of time.

Gas adsorption device 56 is installed for the purpose of adsorbing a residual gas represented by nitrogen and oxygen and a gas represented by nitrogen and oxygen entering from the outside at a predetermined entry amount after sealing at a predetermined adsorption rate with respect to the vacuum heat insulating material vacuum-sealed after evacuation is performed for a predetermined time, and maintaining the vacuum heat insulating material at a predetermined equilibrium pressure.

A main factor of lowering the adsorption capability of gas adsorbent 19 is that gas adsorbent 19 already adsorbs the gas around gas adsorbent 19 before evacuation or during evacuation. In this case, an adsorption amount by gas adsorbent 19 does not reach an amount to be adsorbed originally.

Note that, as for moisture contained in the residual gas and the entering gas from the outside, originally, inexpensive moisture adsorbent 18 should be installed in the same space, and all of the moisture should be adsorbed by moisture adsorbent 18, and the remaining nitrogen, oxygen gas, and the like should be adsorbed by gas adsorbent 19. However, since gas adsorbent 19 adsorbs moisture, there is a case where gas adsorbent 19 cannot adsorb the gas to be originally adsorbed accordingly.

The present disclosure solves both of the above two problems. Specifically, the zeolite as gas adsorbing substance 33 is sealed in vacuum sealed container 34 until the vacuum heat insulating material is vacuum sealed after evacuation. Thereafter, the residual moisture is completely adsorbed by moisture adsorbent 18 for a predetermined time or under a temperature condition. Thereafter, vacuum sealed container 34 is opened by opening pin 35 or the like integrated with vacuum sealed container 34 of gas adsorbing substance 33 by a force physically applied from the outside. This makes it possible to adsorb gases other than surrounding moisture.

In this manner, the pressure is kept constant over a long period of time, so that the heat insulation performance of the vacuum heat insulating material can be reliably maintained over a long period of time.

INDUSTRIAL APPLICABILITY

The vacuum heat insulator in the present disclosure can maintain high heat insulation performance for a long period of time by avoiding deactivation of the gas adsorbing substance and maximizing the adsorption capability of the gas adsorbing substance. Accordingly, it is possible to provide a high-quality vacuum heat insulator which is inexpensive and has high heat insulation performance, and the vacuum heat insulator can be widely applied as a heat insulator for consumer devices such as a refrigerator and an electric water heater, a heat insulator for a vending machine, an automobile, and a house, a heat insulating container and a heat insulating wall using the heat insulator. Further, the present invention can also be applied as a heat insulating container such as a case for accommodating food in a storage chamber.

REFERENCE MARKS IN THE DRAWINGS

1: refrigerator
2, 27b: outer box
3, 26b: inner box
5, 5b: open-cell urethane foam (core material)
7: heat insulating box
7a: front opening part
8: partitioning body
9: freezing chamber
10: refrigerating chamber
11: compressor
12: evaporator
13: evaporating pan
14: outside exterior appearance component
15: inside exterior appearance component
16, 16b: exhaust port
17, 17b: sealing material
18, 41b: moisture adsorbent
19: gas adsorbent
21: cooling chamber wall body
22: machine chamber
23: lower machine chamber
24: cooling chamber
25: refrigerator door
26: inner plate
27: outer plate
31, 31b: gas barrier layer
32, 32b: thermal welding layer
33: gas adsorbing substance
34: vacuum sealed container
35: opening pin
36: spring part
37: pin support part (coupling part)
38: pin part
39: load-bearing spacer
40: heat insulating container
42b: air adsorbent
55: outer packaging material
56: gas adsorption device
60: vacuum heat insulator

The invention claimed is:

1. A vacuum heat insulator comprising:
an outer packaging material including a resin sheet; and
a core material and a gas adsorption device each contained in the outer packaging material,
wherein the gas adsorption device includes
a gas adsorbing substance that adsorbs a gas,
a vacuum sealed container that contains the gas adsorbing substance,
an opening pin that opens the vacuum sealed container by a physical load from an outside of the vacuum sealed container, and
a load-bearing spacer that suppresses displacement of the opening pin to less than or equal to a predetermined amount.

2. The vacuum heat insulator according to claim 1, wherein
the opening pin includes
a pin part that opens the vacuum sealed container,
a spring part that biases the pin part outward, and
a coupling part that couples the pin part and the spring part, and
the coupling part of the opening pin is supported by the load-bearing spacer.

3. The vacuum heat insulator according to claim 2, wherein the load-bearing spacer is disposed between the vacuum sealed container and the coupling part.

4. The vacuum heat insulator according to claim 1, wherein a compressive strength of the load-bearing spacer is 200 kPa or more at 10% strain.

5. The vacuum heat insulator according to claim 1, wherein the load-bearing spacer and the core material are made of an identical material.

6. The vacuum heat insulator according to claim 1, wherein the load-bearing spacer includes open-cell urethane as a material of the load-bearing spacer.

7. A heat insulating container comprising the vacuum heat insulator according to claim 1.

8. A heat insulating wall comprising the vacuum heat insulator according to claim 1.

* * * * *